No. 893,672.
PATENTED JULY 21, 1908.
R. O. STUTSMAN.
TIRE FOR VEHICLE WHEELS.
APPLICATION FILED JULY 16, 1897.
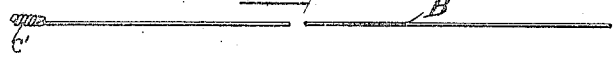
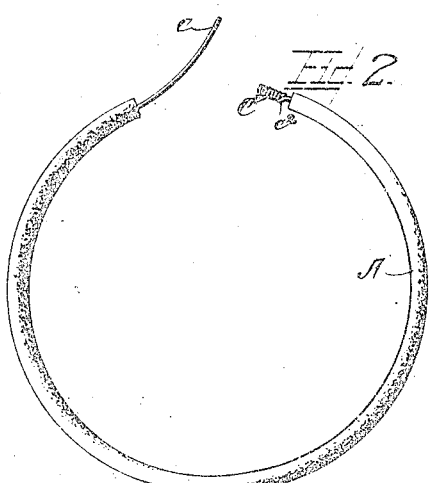
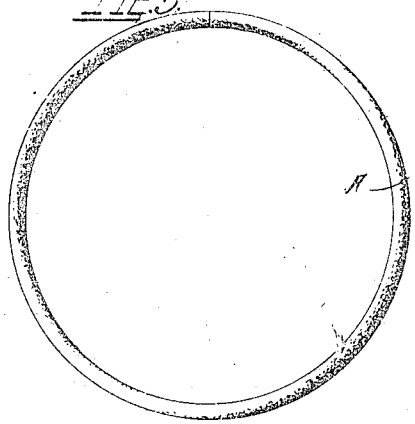
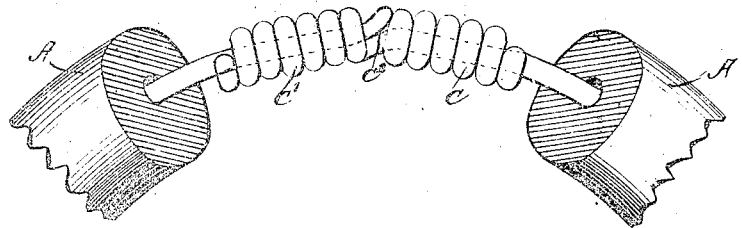
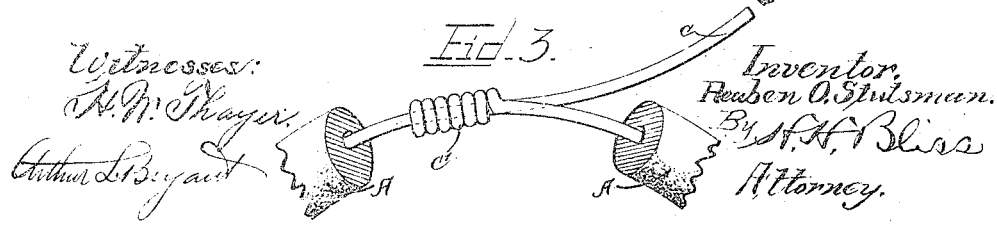

UNITED STATES PATENT OFFICE.

REUBEN O. STUTSMAN, OF DES MOINES, IOWA, ASSIGNOR TO THE BARTHOLOMEW COMPANY, OF DES MOINES, IOWA, A CORPORATION OF IOWA.

TIRE FOR VEHICLE-WHEELS.

No. 893,672.
Specification of Letters Patent.
Patented July 21, 1908.

Application filed July 16, 1897. Serial No. 644,799.

*To all whom it may concern:*

Be it known that I, REUBEN O. STUTSMAN, a citizen of the United States, residing at Des Moines, in the county of Polk and State of Iowa, have invented certain new and useful Improvements in Tires for Vehicle-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 shows a binding wire after the locking coil has been formed at one end; Fig. 2 is a side view of the rubber tire after the wire has been inserted; Fig. 3 shows, on a larger scale, the ends of the rubber and the binding wire just after the straight end has been passed through the end of the first coil; Fig. 4 is a similarly enlarged view, showing the wire after the final locking coil has been formed; and Fig. 5 is a side view of the finished tire.

Heretofore solid rubber tires have been manufactured with wires passed through them for holding together the ends of the rubber, for imparting a certain amount of rigidity and for holding the tire in place upon the rim. But difficulties have been met with, both in the manufacture and in the use of such tire, which it is the object of the present invention to overcome.

In making my improved tire I take the following steps: The rubber A is cut to the proper length, this having a small central longitudinal passage or aperture for the insertion of the wire. The wire is also cut to the requisite length. One of the principal purposes of a supplemental wire is to obviate entirely the necessity of cement as commonly used in securing tires, either cushioned or pneumatic, to rims. After the wire has been cut to length a series of tight left-hand coils of very short pitch are formed at one end, as shown at C. Then the other end of the wire is passed through the rubber until it projects from one end, the end with the coil lying as close as possible to the other end of the rubber. The coil C is in effect a tube at one end of the wire which has an internal diameter just sufficient to permit the opposite free end of the wire to be passed through it lengthwise. Then the straight end of the wire $c$ is passed through the coil C and at a place beyond the initial bend $c^2$ a series of tight right-hand coils of short pitch is formed as shown at C'. These coils are independent of each other; that is to say, the left hand coil is at one end of the wire and the right-hand coil is at the other end. The result is that the two ends of the wire are not only held with firmness because of their interlocking, but this firmness is augmented because of the opposite relations of the coils.

By examining the drawing it will be seen that the fastening consists of two endwise abutting coils, and that each of these coils from end to end surrounds a straight section on the other end of the wire. In this respect the fastening is materially different from what it would be if there were two sets of interlocking coils, one set on each end of the wire.

What I claim is:

1. A rubber vehicle tire consisting of a piece of rubber having an aperture longitudinally through it and a wire inserted in the said aperture, the wire having at one end a tubular portion, and its opposite end being passed through the said tubular portion, and having its free end coiled about the portion of the wire immediately back of the tubular portion, substantially as set forth.

2. A vehicle tire consisting of a piece of rubber having an aperture longitudinally through it and a wire inserted in the said aperture the wire having at one end a tubular portion formed by coiling the wire in one direction, and its opposite end being passed through said tubular portion, and having its free end coiled about the portion of the wire immediately back of the tubular portion and in a direction opposite that of the coil of the said tubular portion, substantially as described.

In testimony whereof, I affix my signature, in presence of two witnesses.

REUBEN O. STUTSMAN.

Witnesses:
W. G. MILES,
O. T. BLACK.